March 28, 1967 P. E. PITT 3,311,824
TRANSIENT INSENSITIVE PHOTOELECTRIC IMPULSE DEVICE FOR
USE WITH WATTHOUR METER TO ACTUATE DEMAND RECORDER
Filed Sept. 6, 1963 3 Sheets-Sheet 1

INVENTOR.
Paul E. Pitt
BY
Darby, Robertson & Vandenburgh
attys.

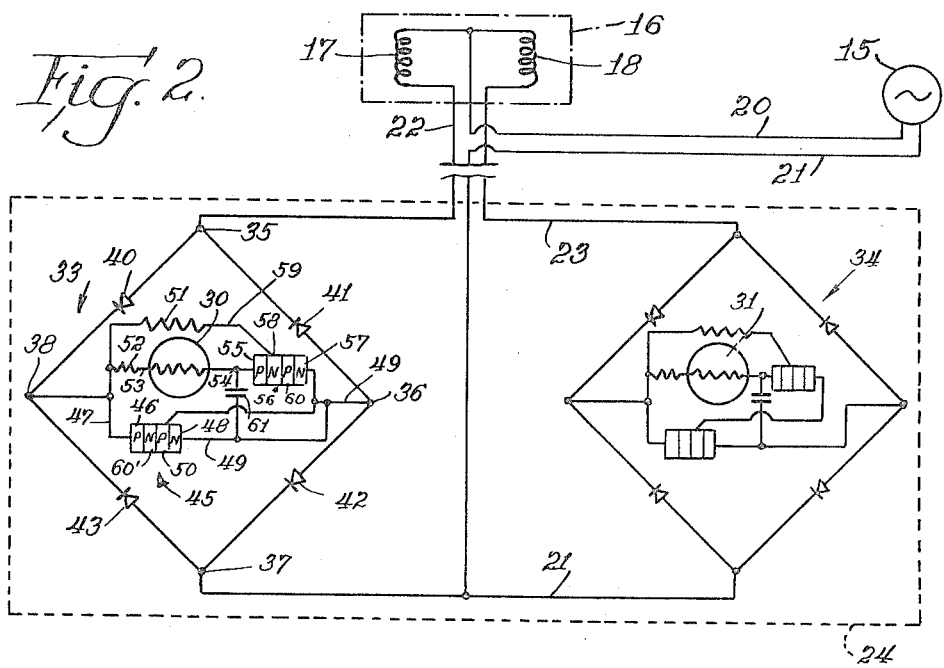
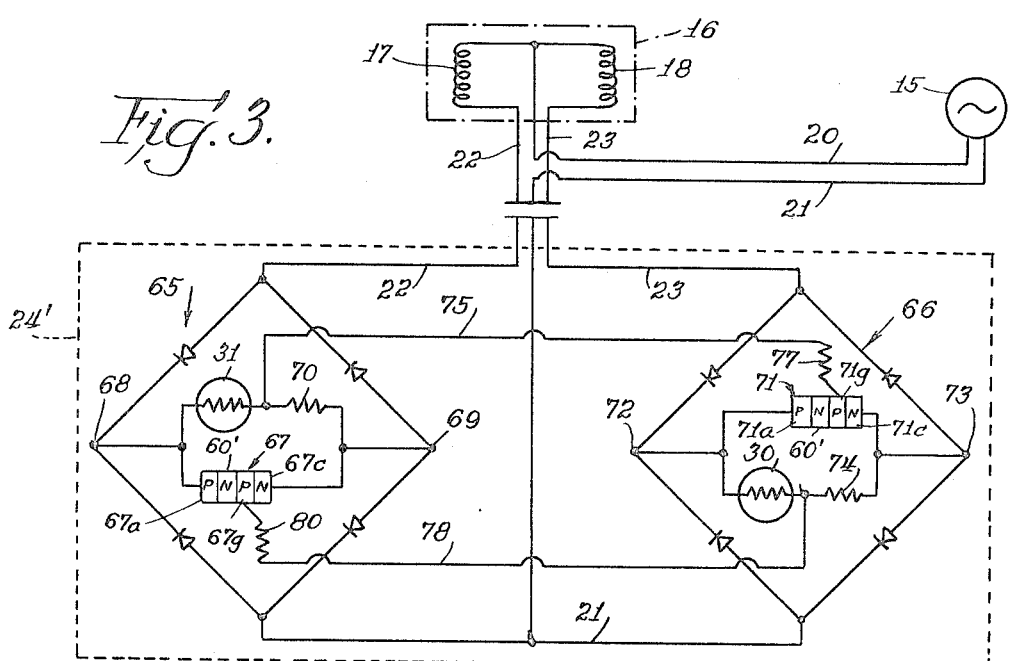

United States Patent Office 3,311,824
Patented Mar. 28, 1967

3,311,824
TRANSIENT INSENSITIVE PHOTOELECTRIC IMPULSE DEVICE FOR USE WITH WATTHOUR METER TO ACTUATE DEMAND RECORDER
Paul E. Pitt, West Lafayette, Ind., assignor to Duncan Electric Company, Inc., Tippecanoe County, Indiana, a corporation of Indiana
Filed Sept. 6, 1963, Ser. No. 307,170
11 Claims. (Cl. 324—103)

This invention relates to impulse devices for watthour meters, and this disclosure is offered for public dissemination in the event a patent is issued. For many years, a form of impulse device known as a contact device has been driven by watthour meter disks to transmit impulses to a device known as a demand recorder.

Contact devices were subject to a fault of interfering with meter accuracy by subjecting the watthour meter disk to a varying load as it operated a cam to shift a contact between cooperating contacts. More modern impulse devices have avoided this fault by using a photoelectric or other electronic detector, but until the present invention, this gain has been accomplished only by sacrificing the old simplicity and compactness of contact devices. It was no longer practicable to place in the conventional meter case all of the necessary parts and components, but an extra housing had to be provided. Furthermore, some of the dependability of the contact device was also sacrificed, the new versions of impulse device tending to be more sensitive to temperature changes, and subject to damage by transient voltages such as that derived from lightning when it struck near the transmission lines to which the device was connected.

According to the preferred form of the present invention, the entire impulse device can be housed within conventional meter casings, and inherent protection is provided against temperature variations and against transient voltage surges. No additional housing is required, and the wiring to the remote recorder comprises the same three wires which have been conventional with contact devices.

An important aspect in achieving these results is in the use of a PNPN type of semiconductor (a silicon controlled rectifier) connected in a circuit in which the semiconductor and other elements mutually protect each other from harm by letting all transient surges pass harmlessly in the forward direction, thereby preventing the build-up of harmful reverse voltages. This in turn permits the use of silicon diodes which have satisfactory temperature characteristics.

Additional objects and advantages of this invention will be apparent from the following description and from the drawings in which:

FIGURE 2 is a schematic diagram of the wiring of an impulse device;

FIGURE 3 is a schematic diagram of the wiring of an alternative form of the invention.

Although the following disclosure offered for public dissemination is detailed to ensure adequacy and aid understanding this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Figure 1:
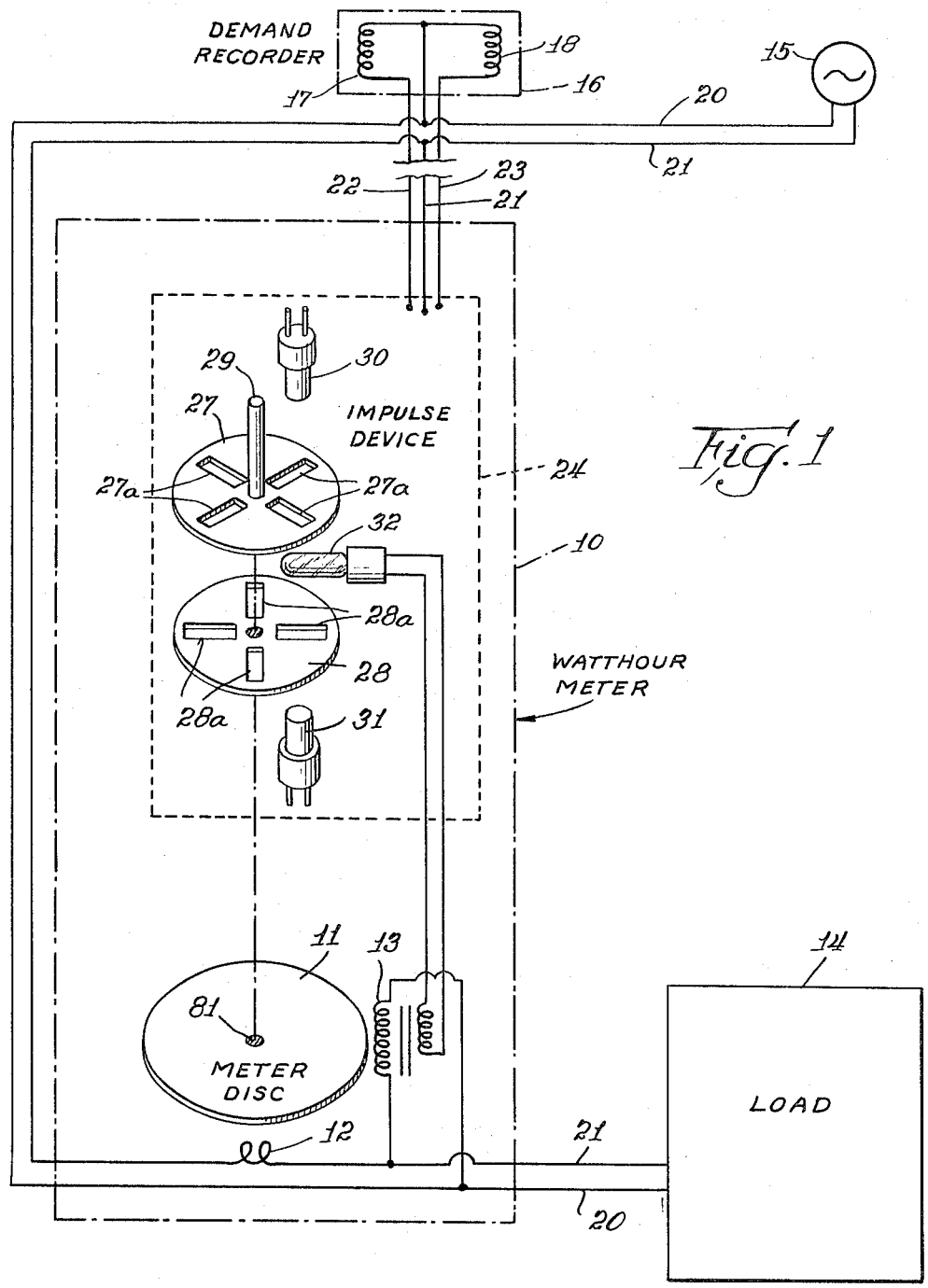
FIGURE 1 is a diagrammatic illustration of the manner in which an impulse device of the present invention would be employed in connection with a watthour meter, a demand recorder, etc.

Referring to FIGURE 1, the dot-dash line 10 represents the case of a watthour meter. As is well known in the art, such meters include a rotor having at least one meter disk 11 which is caused to rotate by reason of the interacting magnetic fields from coils 12 and 13 and from the currents they induce in disk 11. Such meters are employed to measure the power or energy being drawn from a load 14 from a source of power 15 through power lines 20 and 21. Indicating devices, e.g., demand recorders 16 are conventional as previously mentioned and the details thereof form no part of the present invention except as to their being in the combination. To illustrate the manner in which the present invention is used in conjunction with a demand recorder, it is sufficient to say that in one common form the recorder includes a pair of solenoids or inductances 17 and 18. One side of each of solenoids 17 and 18 is connected to power lead 20. The other sides of solenoids 17 and 18 are connected to wires 22 and 23 respectively. Thus, there are two wires 22 and 23 plus one power lead, e.g. 21, connecting the demand recorder 16 with the impulse device 24. This three-wire connection may be as much as several miles in length.

The impulse or pulsing device 24 incorporates a pair of shutters 27 and 28 mounted on a rotatable shaft 29 operatively connected to meter disk 11 to be rotated. The shutters serve as choppers for the light from bulb 32. This portion of the structure is known in the art, and it is represented diagrammatically. Its function is to illuminate photocells 30 and 31 alternately from light 32 at a rate which is a function of the rotation of meter disk 11. To this end, shutters 27 and 28 have openings or cutouts 27a and 28a. Only four of these cutouts per disk are shown in the structure of FIGURE 1. The exact number and configuration of the openings may be varied to satisfy the requirements of a particular device and preferences of a designer. Depending on the demand range expected, the number of openings and the drive of the shutters may, according to present practice, be such that each shutter provides flashes anywhere in the range of from ten flashes per revolution of the meter disk to one flash per ten revolutions. In any event the cutouts or openings are so positioned that at one position of rotation of shaft 29, photocell 30 will be illuminated by light 32 while at the same time the illumination from light 32 will be blocked from reaching photocell 31. As shaft 29 rotates, it will reach a subsequent position at which the light is blocked from reaching photocell 30 but is permitted to illuminate photocell 31. In the illustrated embodiment, photocells 30 and 31 are of a photoconductive type with a relatively high resistance when not illuminated and a relatively low resistance when illuminated. It may be desirable to include a light shield 26 (FIGURE 4) as a part of the pulsing device to prevent excessive ambient light from reaching the photocells.

Referring to FIGURE 2, it will be seen that the pulsing device 24 embodies two full wave rectifier bridges, one of which includes photocell 30 and is connected to pulse transmitting wire 22 (solenoid 17), and the other of which includes photocell 31 and is connected to pulse transmitting wire 23 (solenoid 18). The first of these bridges is numbered generally 33 and the other generally 34. They are employed as variable impedances to control the flow of current through the respective solenoid 17 or 18. They are identical and a description of bridge 33 will serve to also describe the structure of bridge 34.

Bridge 33 has four arms connected in ring fashion and defining four junctions 35-38. The arms between the junctions are represented by four silicon rectifiers 40–43. Thus although junctions 35 and 37 are energized by alternating current from wires 22 and 21, and hence may be called alternating current connections, junctions 36 and 38 form a pair of direct current connections for the elements connected between them. A PNPN silicon controlled rectifier (SCR) 45 has an anode 46 connected to junction 38 by wire 47, a cathode 48 connected to junction 36 by a wire 49 and a gate 50. Wire 47 also connnects resistors 51 and 52 to junction 38. The other end of resistor 52 is connected to photocell 30 by a wire 53. A wire 54 connects photocell 30 to the anode 55 of a PNPN silicon controlled switch (SCS) 56. Silicon controlled switch 56 also has a cathode 57, and a gate 58 connected by a wire 59 to resistor 51. Layer 60 in silicon controlled switch 56 and layer 60' in silicon controlled rectifier 45 are called gates but have no separate connections to make them serve the usual function of gates. A capacitor 61 is connected between wires 49 and 54.

To identify a specific embodiment employed in conjunction with a solenoid 17, or 18, having a nominal impedance at 60 cycles of approximately 3000 ohms, the following specific components are identified. Rectifiers 40–43 are parts in a Mallory FW 500 type rectifier, a preassembled bridge packet. Silicon controlled rectifier 45 is a Texas Instrument TI 145A2. Silicon controlled switch 56 is a General Electric 3N58. Photocell 30 is a Clairex CL 903. Resistors 51 and 52 are 33K ohms and 100K ohms, respectively. Capacitor 61 is 0.01 mfd.

So long as photocell 30 is not illuminated, there is no significant conduction through silicon controlled switch 56 nor through silicon controlled rectifier 45. This presents a high impedance to the flow of current between junctions 35 and 37 of the bridge. This high impedance effectively blocks current flow through solenoid 17. When photocell 30 is illuminated, its resistance drops to a nominal value as compared to its dark resistance. During either half cycle of the alternating current, junction 38 is positive with respect to junction 36. With this condition and with the resistance of photocell 30 being inconsequential, there is sufficient power present at anode 55 to initiate conduction through silicon controlled switch 56. Prior to the instant at which this sufficient power is available, and while it is building up, the process of charging capacitor 61 will take place.

Immediately upon conduction commencing through silicon controlled switch 56 from the anode to the cathode thereof, capacitor 61 discharges therethrough to apply a current pulse to gate 50 of silicon controlled rectifier 45. This current pulse in turn initiates conduction through silicon controlled rectifier 45 with the result that there then is a current flow therethrough between junctions 38 and 36. At this stage, bridge 33 appears as a relatively low impedance in the series circuit through solenoid 17 permitting current flow through the solenoid. When the natural current zero is approached at the end of the half cycle, silicon controlled rectifier 45 turns off. However, with the start of the next half cycle, it is almost immediately again turned on by silicon controlled switch 56, to maintain solenoid 17 energized so long as photocell 30 remains illuminated. However, should the illumination have been removed from photocell 30, it again will present a high resistance in the circuit. This resistance, coupled with the resistance of resistor 52, is such that, at the commencement of a half cycle following a natural current zero which caused silicon controlled rectifier 45 to turn off, there is not sufficient power available to anode 55 of silicon controlled switch 56 to initiate conduction therethrough, and the impulse to the solenoid 17 or 18 terminates.

It will be noted that silicon controlled switch 56 has anode gate 58 tied to junction 38 through resistor 51. Anode gate 58 is not used to initiate the firing of silicon controlled switch 56. Instead, the voltage applied thereto is of a polarity which in semiconductor theory would inhibit the ability of the silicon controlled switch to conduct (reverse gate biasing); that is, more power applied elsewhere is required to initiate conduction or to maintain conduction than would otherwise be the case. One effect of this is to insure that capacitor 61 is charged to an amount sufficient to initiate conduction of silicon controlled rectifier 45 before silicon controlled switch 56 dumps the charge of the capacitor into switch 56. When silicon controlled switch 56 fires, or conducts, there will also be a current flow from gate 58 to cathode 57. Silicon controlled switch 56 as employed in the present invention has been found to have an unexpected stabilizing effect. As a result, there is less effect of rising temperature in reducing the voltage at which the switch passes current. Conduction of silicon controlled switch 56 is initiated by raising the power at the anode 55 as a result of the decrease in the resistance provided by photocell 30. In some embodiments, a Zener diode, which similarly initiates conduction, could be substituted for silicon controlled switch 56 with the elimination of resistor 51, but it would not be as advantageous.

Bridge 34 operates correspondingly. When photocell 31 is dark, bridge 34 presents a high impedance in the series circuit that includes solenoid 18 and prevents current flow therethrough. When photocell 31 is illuminated, a conduction is initiated between the two direct current junctions of the bridge so that the bridge now presents a relatively low impedance in the circuit and current flow through solenoid 18 is permitted. This conduction is maintained (except for the very brief intervals at the occurrence of a natural current zero) so long as photocell 31 remains illuminated. These intervals are so brief, with respect to the reaction time of the solenoids, that the electrical flow through a solenoid may be considered to be a single pulse so long as the respective photocell remains illuminated.

Referring again to FIGURE 1, it will now be apparent that the required alternate actuation of solenoids 17 and 18 is controlled by the pulsing of the illumination between light 32 and photocells 30 and 31. The rate at which this pulsing is performed for any given speed of rotation of meter disk 11 will be dependent upon the desires of the manufacturer and user of the equipment. Such pulse rates always are much less frequent than is the frequency of the 60 cycle current from source 15. It has been uneconomical to embody in a demand recorder such as 16, equipment sufficient to operate at a pulse rate anywhere near the 60 cycle frequency.

It should be recognized that the present invention can be employed in applications wherein wires per se, e.g. wires 21–23 do not physically extend between the impulse device 24 and the apparatus that makes a record of the operation of the watthour meter, e.g. demand recorder 16. For example, wires 21–23 might extend only to a microwave transmitter from which signals were transmitted to a distant microwave receiver which in turn actuated a demand recorder or a totalizer.

Some demand recorders employ only a single solenoid, but since it is also actuated alternately through two impulse transmission wires 22 and 23, cooperating in turn with a common wire 20, the illustrated embodiments of the present invention are compatible with such demand recorders. Hence they can be substituted for the impulse devices presently used to actuate various present recorders. In some types of demand recorders the load impedance is so high that insufficient current will flow (at the normal line voltage) to enable silicon controlled rectifier 45 to initiate or maintain conduction. With such recorders the load impedance (e.g. solenoid 17 or the functionally corresponding element of the particular demand recorder) can be shunted by a resistor to increase the current flow in the circuit to a level at which the silicon controlled rectifier of the impulse device will conduct. In considering the impedance of the load of the impulse device, one may have to take into consideration, in some instances, the impedance of the three-wire connecting line.

Should a lightning induced transient voltage appear on power lines 20 or 21, this will be safely passed through the impulse device without damage to any of the components thereof. As those in the field are aware, such transients may be of relatively high voltage. At the same time they have a relatively steep wave front, i.e. high rate of change of voltage ($dv/dt$). This rate of change is similar to the rate of change that appears in a high frequency alternating current. Because of the bridge type circuitry, a positive voltage will appear at junction 38 and a negative voltage at junction 36 no matter what may be the polarity of the lightning stroke as it appears in the lines 20 or 21. Thus this excessive voltage never will be applied to silicon controlled rectifier 45, or the silicon controlled switch 56, in the reverse direction, but will always be applied in the forward direction. This is important inasmuch as these semiconductors are subject to damage, by high reverse voltages. A PNPN controlled rectifier such as is employed in my invention will initiate conduction when excessive voltages are applied in the forward direction. Another characteristic of such rectifiers is that the steeper the wave front, i.e. the higher the rate of change, of the applied voltage, the smaller need be the applied forward voltage before conduction will commence. For example, a PNPN controlled rectifier with a static breakdown voltage of over 80 volts will break down and conduct at approximately 13 volts when a 2 nanosecond pulse is applied to it. When a lightning induced transient voltage occurs, the short rise time will cause the junction to break down at a much lower voltage than it would ordinarily. Of course when the junction breaks down, the impedance of the bridge becomes negligible, the transient current then is limited by the primary load, e.g. solenoid 17. The vast majority of transient voltages (derived from remote strikes by lightning, switching, capacitor charging or discharging, etc.) are thus passed harmlessly. Furthermore, such surges normally are of such short duration that the resulting signal will not actuate a solenoid type demand recorder to produce a false indication.

Embodiments of the invention can be produced in which two legs of the rectifier bridge are replaced by the center tapped secondary of a transformer. The primary of the transformer then is connected in series with the respective solenoid, e.g. 17. For example, rectifiers 40 and 43 would be eliminated. Junction 38 would become the center tap of the secondary while junctions 35 and 37 would become the two end connections of the secondary. Wires 21 and 22 would be connected to the primary of the transformer rather than to junctions 35 and 37.

FIGURE 3 illustrates an alternative embodiment incorporating two bridges generally 65 and 66. Bridge 65 is connected in series with solenoid 17 to control the operation thereof. Bridge 66 is connected in series with solenoid 18. However in this instance, photoelectric cell 30 which controls the pulsing of solenoid 17, forms a part of bridge 66 while photocell 31 controlling the operation of solenoid 18 forms a part of bridge 65.

Referring to bridge 65, a silicon controlled rectifier 67 is connected between direct current junctions 68 and 69 of the bridge. Photocell 31 and a resistor 70 are in series and the two are in parallel with silicon controlled rectifier 67. Similarly in bridge 66, a silicon controlled rectifier 71 is across direct current junctions 72 and 73 of the bridge and the series combination of photocell 30 and a resistor 74 are in parallel with silicon controlled rectifier 71. A wire 75 connects at one end to the common point of resistor 70 and photocell 31. At the other end, wire 75 connects to cathode gate 71g of silicon controlled rectifier 71. A resistor 77 is interposed between the two ends. Similarly a wire 78 interconnects cathode gate 67g and the common point between photocell 30 and resistor 74 with a resistor 80 between the two ends of the wire.

When photocell 31 is illuminated, its resistance drops. With a direct current voltage appearing both between junctions 68 and 69 and junctions 72 and 73, a pulse is produced by the lowered resistance of the photocell. This pulse is transmitted over wire 75 through resistor 77 to gate 71g of silicon controlled rectifier 71. This initiates conduction of silicon controlled rectifier 71. The impedance of bridge 66 thereby becomes low and current will flow through solenoid 18. While silicon controlled rectifier 71 will turn off at the end of every half cycle, it will again be turned on after the commencement of the next half cycle so long as photocell 31 remains illuminated. Of course when photocell 31 goes dark, its resistance will be high and no pulse to rectifier 71 will be produced. Silicon controlled rectifier 71 will not again turn on at the beginning of the subsequent half cycle since no pulse is applied to its gate. The electrical impulse through solenoid 18 thereby terminates. Similarly when photocell 30 is illuminated, it initiates conduction through silicon controlled rectifier 67 and an electrical pulse is thereby initiated in solenoid 17. This pulse terminates when photocell 30 is no longer illuminated.

Embodiments of the present invention are admirably suited for use as impulse devices. They are compatible with existing demand recorders, a feature that is most significant to the user. Their compactness permits them to be installed readily in the case of a watthour meter. The number of individual components is most nominal. No power supply, in the sense of a conventional power supply for an amplifier, is required. As previously explained, a lightning induced surge in the power lines will be passed without harm to the equipment.

An important feature is that the impulse device is insensitive, for all practical purposes, to temperature variations within the range normally encountered in operation. This is all the more significant in view of the fact that photocells are notoriously sensitive to temperature variations. Photoconductive cells such as used herein shorten the range between the light and dark resistances as temperatures are increased. Normally, this would make devices embodying such cells relatively sensitive to temperature changes. In the present invention at least three factors are important in achieving temperature stability. One is the fact that the power applied across the silicon controlled switch 56 when photocell 30 is dark is entirely insufficient to initiate conduction, even taking into account the resistance variations in photocell 30 with changes in temperature. A second is the application of a positive voltage to the anode gate 58 (reverse biasing of the gate). A third, but no less important, feature is the use of silicon semiconductors for the diodes, the silicon controlled switch and the silicon controlled rectifier. In spite of the well known sensitivity of such silicon semiconductors to reverse high voltages, they can be used because the circuitry which causes all high transient surges to be passed in forward direction by a silicon controlled rectifier, thereby prevents the build-up of a high reverse voltage on any of the elements.

Figure 4:
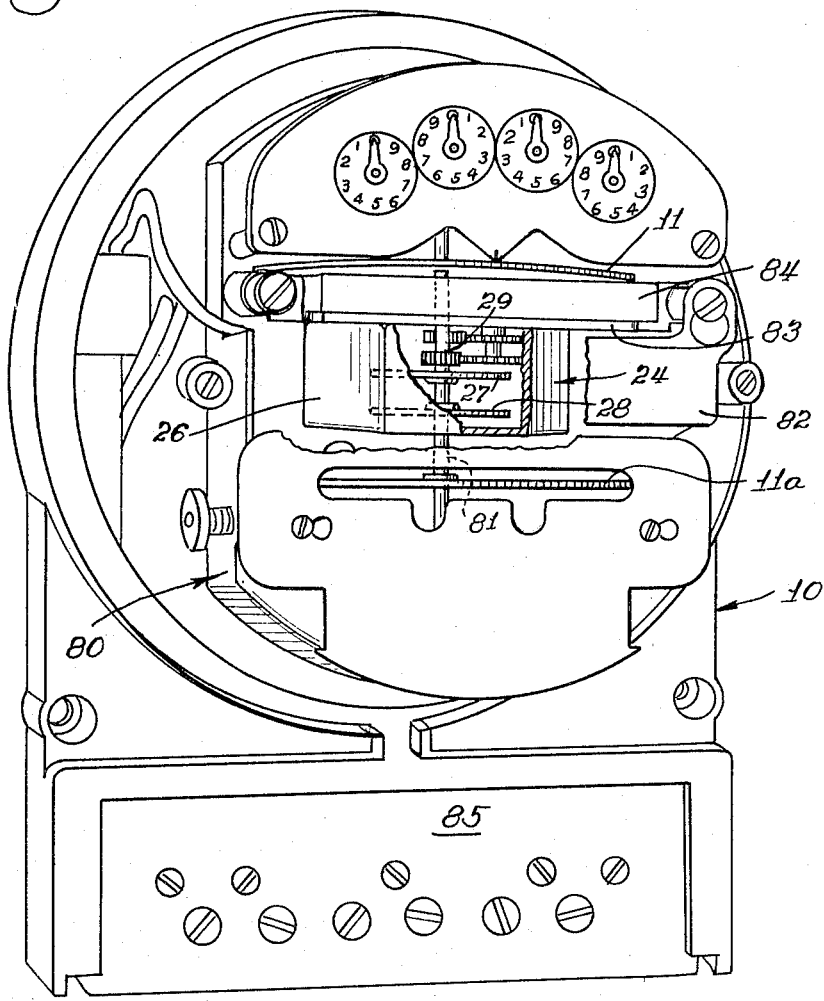
FIGURE 4 is a perspective view of the commercial embodiment of a two disk, three phase meter (with the cover removed and portions broken away) incorporating the impulse device of this invention.

FIGURE 4 shows how little space is required by a commercial embodiment of the impulse devices of the present invention. The meter case 10 (conventional cover omitted) houses a conventional meter mechanism 80 of a polyphase type having two disks 11 and 11a on one shaft 81. The entire impulse device is mounted in the space which can be generally described as between the disks and substantially behind a conventional data plate 82. A support plate 83 carries beneath it and behind light-shield 26 the entire mechanism of shutters 27 and 28, photocells 30 and 31 and lamp 32. Block or board 84 above plate 82 is a plastic carrier bearing printed circuitry and carrying all of the other elements of the bridges 33 and 34. Terminal block 85 may include conventional terminals for the impulse transmission conductors or such terminals may be inside the meter housing.

Aging of components normally will not cause problems with embodiments of the invention. As a matter of fact even though the illumination from light 32 may drop substantially with age, this will not impair the operation of the impulse devices. One factor in the reliability and aging control is that the impulse devices of the invention are very conservatively rated. The most that any conventional demand recorder requires is about ten volt-amperes. Yet, the specific embodiment previously identified, is capable of handling about sixty volt-amperes continuous, and more on peaks.

Embodiments of the invention are not sensitive to fluctuations of voltage within a range in which a demand recorder will still work. As those skilled in the art are aware, voltage fluctuations will occur as a result of excess demand in relation to the power supply, etc. Impulse devices of the present invention, intended to operate at about 115 volts, will operate satisfactorily at 85 volts or at 160 volts.

I claim:

1. A demand meter apparatus for use with a watthour meter and power lines from a source of electrical power, said apparatus comprising in combination: a demand recorder having two impulse responsive devices; and a cycling switch including two impedance control means, one of the means being connected in a circuit in series with one device and the lines to actuate the one device by presenting a relatively low impedance in the circuit and to deactuate the one device by presenting a relatively high impedance, the other means being connected in a circuit in series with the other device and the lines to actuate the other device by presenting a relatively low impedance in the circuit and to deactuate the other device by presenting a relatively high impedance, each means being adapted to present a relatively low impedance when a high voltage transient impulse characteristic of the results of a lightning stroke on the lines is applied thereto, each of said means including a full wave bridge rectifier having a pair of alternating current junctions and a pair of direct current junctions, said alternating current junctions being connected in series with said lines and the respective device, each of said means also including a silicon controlled rectifier having an anode, a cathode and a gate, said anode and cathode being connected between the direct current junctions for forward current flow therebetween; said switch including a pair of photoconductive cells whose resistance diminishes with increased light, each cell being operatively connected to a respective gate to render the respective controlled rectifier operative to pass current therethrough when the cell is illuminated, an electric light positioned to illuminate said cells, and shutter means to cut off the illumination between the light and the cells alternatively, at a rate which is a function of the electrical demand measured by said watthour meter.

2. A demand meter apparatus for use with a watthour meter and power lines from a source of electrical power, said apparatus comprising in combination: a demand recorder having two impulse responsive devices; and a cycling switch including two impedance control means, one of the means being connected in a circuit in series with one device and the lines to actuate the one device by presenting a relatively low impedance in the circuit and to deactuate the one device by presenting a relatively high impedance, the other means being connected in a circuit in series with the other device and the lines to actuate the other device by presenting a relatively low impedance in the circuit and to deactuate the other device by presenting a relatively high impedance, each means being adapted to present a relatively low impedance with a high voltage transient impulse characteristic of the results of a lightning stroke on the source of power is applied thereto; each of said means comprising a full wave rectifier device having four arms joined in a ring and defining two pairs of junctions, rectifiers in two adjacent arms and connected to pass current in the same direction as related to the one junction intermediate said two arms, a controlled rectifier having an anode member, a cathode member and a gate, said members being connected to said one junction and to the other junction of the one pair of which said one junction is a part to permit current flowing in either of said two arms to flow between said one pair of junctions when the controlled rectifier permits the flow of current therethrough; said switch including a pair of photoconductive cells whose resistance diminishes with increased light, each cell being operatively connected to a respective gate to render the respective controlled rectifier operative to pass current therethrough when the cell is illuminated, an electric light positioned to illuminate said cells, and shutter means to cut off the illumination between the light and the cells alternatively, at a rate which is a function of the electrical demand measured by said watthour meter.

3. A demand meter apparatus for use with a watthour meter and lines from a source of electrical power, said apparatus comprising in combination: a demand recorder having two impulse responsive devices; and a cycling switch including two impedance control means, one of the means being connected in a circuit in series with one device and the lines to actuate the one device by presenting a relatively low impedance in the circuit and to deactuate the one device by presenting a relatively high impedance, the other means being connected in a circuit in series with the other device and the lines to actuate the other device by presenting a relatively low impedance in the circuit and to deactuate the other device by presenting a relatively high impedance, each means being adapted to present a relatively low impedance when a high voltage transient impulse characteristic of the results of a lightning stroke on the lines is applied thereto; each of said means comprising a circuit having four arms joined in a ring and defining two pairs of junctions, rectifiers in two adjacent arms and connected to pass current in the same direction as related to the one junction intermediate said two arms, and a controlled rectifier connected to said one junction and to the other junction of the pair or which said one junction is a part; said switch including means connected to said watthour meter and to the controlled rectifiers to periodically open one rectifier and close the other rectifier, and vice versa, at a rate which is a function of the electrical demand measured by said watthour meter.

4. A demand meter apparatus for use with a watthour meter and power lines from a source of electrical power, said apparatus comprising in combination: a demand recorder having two impulse responsive devices; and a cycling switch including two impedance control means, one of the means being connected in a circuit in series with one device and the lines to actuate the one device by presenting a relatively low impedance in the circuit and to deactuate the one device by presenting a relatively high impedance, the other means being connected in a circuit in series with the other device and the lines to actuate the other device by presenting a relatively low impedance in the circuit and to deactuate the other device by presenting a relatively high impedance, each means being adapted to present a relatively low impedance when a high voltage transient impulse characteristic of the results of a lightning stroke on the lines is applied thereto, said switch including means connected to said watthour meter to periodically raise the impedance of one means and to lower the impedance of the other means, and vice versa, at a rate which is a function of the electrical demand measured by said watthour meter.

5. An apparatus for use with a watthour meter and adapted to be connected to an indicating device and to a source of electrical power to deliver a current pulse to the indicating device in response to the illumination of a photoconductive cell whose resistance diminishes upon the illumination of the cell, said apparatus including: a full wave bridge rectifier having a pair of alternating current junctions and a pair of direct current junctions, said alternating current junctions being connected in series with said source of power and the indicating device, a controlled rectifier having an anode, a cathode and a gate, said anode and cathode being connected between the direct current junctions for forward current flow therebetween, and means connected to said gate, to said cell, and to at least one of the direct current junctions to deliver a current pulse to said gate to cause current flow in the controlled rectifier when said cell is illuminated and a voltage is present across the direct current junctions.

6. An apparatus for use with a watthour meter and adapted to be connected to an indicating device having a pair of inductances and to a source of electrical power to deliver current pulses to the inductances alternately in response to the alternate illumination of two photoconductive electric cells at a rate that is a function of the speed of operation of the watthour meter, said apparatus comprising two full wave bridge rectifiers having a pair of alternating current junctions and a pair of direct current junctions, said alternating current junctions being connected in series with said source of power and the respective inductance, and a controlled rectifier having an anode, a cathode and a gate, said anode and cathode being connected between the direct current junctions for forward current flow therebetween; means connected to one gate, one cell and at least one of the direct current junctions of one bridge to deliver a current pulse to said one gate to cause current flow in the respective controlled rectifier when said one cell is illuminated and a voltage is present across said direct current junctions; and means connected to the other gate, the other cell and at least one of the direct current junctions of the other bridge to deliver a current pulse to said other gate to cause current flow in the respective controlled rectifier when said other cell is illuminated and a voltage is present across said direct current junctions.

7. An apparatus for use with a watthour meter and adapted to be connected to an indicating device having a pair of inductances and to a source of electrical power to deliver current pulses to the inductances alternately in response to the alternate illumination of two photoconductive electric cells at a rate that is a function of the speed of operation of the watthour meter, said apparatus comprising two full wave bridge rectifiers having a pair of alternating current junctions and a pair of direct current junctions, said alternating current junctions being connected in series with said source of power and the respective inductance, and a controlled rectifier having an anode, a cathode and a gate, said anode and cathode being connected between the direct current junctions for forward current flow therebetween; means connected to one gate, one cell and at least one of the direct current junctions of one bridge to deliver a current pulse to said one gate to cause current flow in the respective controlled rectifier when said one cell is illuminated and a voltage is present across said direct current junctions; and means connected to the other gate, the other cell and at least one of the direct current junctions of the other bridge to deliver a current pulse to said other gate to cause current flow in the respective controlled rectifier when said other cell is illuminated and a voltage is present across said direct current junctions, each of said means including a silicon controlled switch connected in series with the respective cell and gate and also connected to pass a current pulse when the voltage thereacross is raised by the decrease in resistance of the respective cell.

8. An apparatus for use with a watthour meter, power lines from a source of electrical power, an indicating device having two impulse responsive devices and two photoconductive electric cells alternately illuminated at a rate that is a function of the rate of demand indicated by the watthour meter, said apparatus including: two impedance control means, one of the means being connected in a circuit in series with one device and the lines to actuate the one device by presenting a relatively low impedance in the circuit and to deactuate the one device by presenting a relatively high impedance, the other means being connected in a circuit in series with the other device and the lines to actuate the other device by presenting a relatively low impedance in the circuit and to deactuate the other device by presenting a relatively high impedance, each means being adapted to present a relatively low impedance when a high voltage transient impulse characteristic of the results of a lightning stroke on the lines is applied thereto; each of said means comprising a circuit having four arms joined in a ring and defining two pairs of junctions, rectifiers in two adjacent arms and connected to pass current in the same direction as related to the one junction intermediate said two arms, and a controlled rectifier connected to said one junction and to the other junction of the pair of which said one junction is a part; and means connecting said one means and one cell to one gate and connecting said other means and the other cell to the other gate to periodically open one rectifier and close the other rectifier when the one cell is illuminated and the other is not and vice versa.

9. A demand signaling apparatus for use with an indicating device having two impulse responsive devices connected to power lines from a source of electric power, said apparatus including: a case; a watthour meter in said case; and a cycling switch means in said case, operatively connected to the meter and adapted to be connected in circuits with each of the devices to periodically, at a rate which is a function of the demand measured by said meter, present a relatively high impedance in a first circuit including one device and a relatively low impedance in a second circuit including the other device, and alternatively to present a relatively low impedance in the first circuit and a relatively high impedance in the second circuit, said means including two silicon controlled rectifiers, each serving in a respective one of said circuits, and means to cause the voltage applied to said rectifiers to always be in a forward direction despite the polarity of the electricity in the power lines.

10. The combination of:
(A) a watthour meter mechanism including a disk, and driving and retarding magnets acting on said disk;
(B) a casing conventional for said mechanism;
(C) three impulse transmission terminals associated with the casing for connection with impulse transmission lines;
(D) and an impulse device within said casing including:
  (1) a pair of photocells, a lamp, and shutter means driven by the disk for causing the photocells to be illuminated alternately,
  (2) a bridge for each photocell connected between different pairs of said terminals,
    (a) each bridging comprising a full wave rectifier bridge having silicon diodes and rectified voltage points,
  (3) a silicon controlled rectifier connected between said points and having a gate,
  (4) and means connecting one of said photocells in a path between rectified voltage points of said bridges, said means also being connected to said gate to control said silicon controlled rectifier to pass impulses as its controlling photocell is successively illuminated and darkened.

11. A demand meter apparatus for use with a watthour meter, power lines from a source of electrical power and an indicating device including impedance means and three wires operatively connecting the apparatus to the impedance means, said apparatus comprising: a cycling switch including two impedance control means, one of said control means being adapted to be connected between a first and a second of said wires, the other of said control means being adapted to be connected between said first and the third wires, said means being adapted to actuate the indicating device by sequentially at times presenting a relatively high impedance between the first and second wires while presenting a relatively low impedance between the first and third wires and at intermediate times presenting a relatively low impedance between the first and second wires while presenting a relatively high impedance between the first and third wires, each control means being adapted to present a relatively low impedance when a high voltage transient impulse characteristic of the results of a lightning stroke on the lines is applied thereto, said switch including means responsive to said watthour meter to lower the impedance of the impedance control means alternately, at a rate which is ta function of the electrical demand measured by said watthour meter.

References Cited by the Examiner
UNITED STATES PATENTS 2,788,488    4/1957    Graefnitz _____ 324—138 X WALTER L. CARLSON, *Primary Examiner.*

G. L. LETT, J. J. MULROONEY, *Assistant Examiners.*